D. C. REINOHL.
APPARATUS FOR TREATING ORES.
APPLICATION FILED MAY 13, 1912.

1,081,516.

Patented Dec. 16, 1913.

D. C. REINOHL.
APPARATUS FOR TREATING ORES.
APPLICATION FILED MAY 13, 1912.

1,081,516.

Patented Dec. 16, 1913.

UNITED STATES PATENT OFFICE.

DAVID C. REINOHL, OF WASHINGTON, DISTRICT OF COLUMBIA.

APPARATUS FOR TREATING ORES.

1,081,516.   Specification of Letters Patent.   Patented Dec. 16, 1913.

Application filed May 13, 1912. Serial No. 697,003.

*To all whom it may concern:*

Be it known that I, DAVID C. REINOHL, a citizen of the United States, residing at Washington, in the District of Columbia, have invented certain new and useful Improvements in Apparatus for Treating Ores; and I do hereby declare the following to be a full, clear, and exact description of the invention, such as will enable others skilled in the art to which it appertains to make and use the same.

This invention relates to the art of extracting, separating or recovering precious metals or values from their ores, has for its object economy or saving in the chemical solution used, reduction in the time required for treating the ore to effect contact between the solution and the values contained in the ore, and the saving of labor in handling the ore.

The invention consists in certain improvements which will be fully disclosed in the following specification and claims.

This application is filed as a substitute for my application #612,950, filed March 7th, 1911.

In the prevailing practice of treating ore for recovering values, crushed or pulverized ore is conducted to a concentration table, from which the heavy particles of gold and silver are conducted to a concentrate box, and the light particles, slimes and tailings are conducted to a series of leaching tanks, where they are subjected to an alkaline solution, a solution of cyanid of sodium, or cyanid of potassium, or other chemical used for the purpose, and are thoroughly saturated with the solution, and are aerated by forcing air through the ore during the operation of leaching. This operation continues about forty-eight hours. The solution containing the values is conducted to the gold and silver tanks, and a stronger solution of cyanid is supplied to the leaching tanks for washing out or increasing the contact between the solution and the values remaining in the leaching tanks, and is continued until the assays show that the values have been removed from the sand. The washing out of the sand in the leaching tanks and conducting the values in solution into the gold and silver tanks requires from forty-eight to one hundred hours, according to the nature of the ore being treated. As the assays of the sand in the leaching tanks are being made, assays are also made of the solution in the gold and silver tanks, and in this way the progress of the work is determined. From the gold and silver tanks, the solution is conducted into zinc-boxes where the values in solution attach or adhere to the zinc shavings, while the cyanid solution passes off into the sump tanks.

By my process and apparatus the leaching tanks and the gold and silver tanks are dispensed with, the time required for leaching the ore, forty-eight hours, and the time required for washing out the values in the leaching tanks and conducting them to the gold and silver tanks, from forty-eight to one hundred hours eliminated, and the contact between the alkaline or cyanid solution and the values made while the ore and the solution are in transit and exposed to the atmosphere from a source of supply to a combined settling tank and filter, in about fifteen minutes, said tank being preferably of my construction, shown in my application for a patent, filed March 7th, 1911, Serial Number 612,951.

In the accompanying drawings, which form part of this specification.

Figure 1:
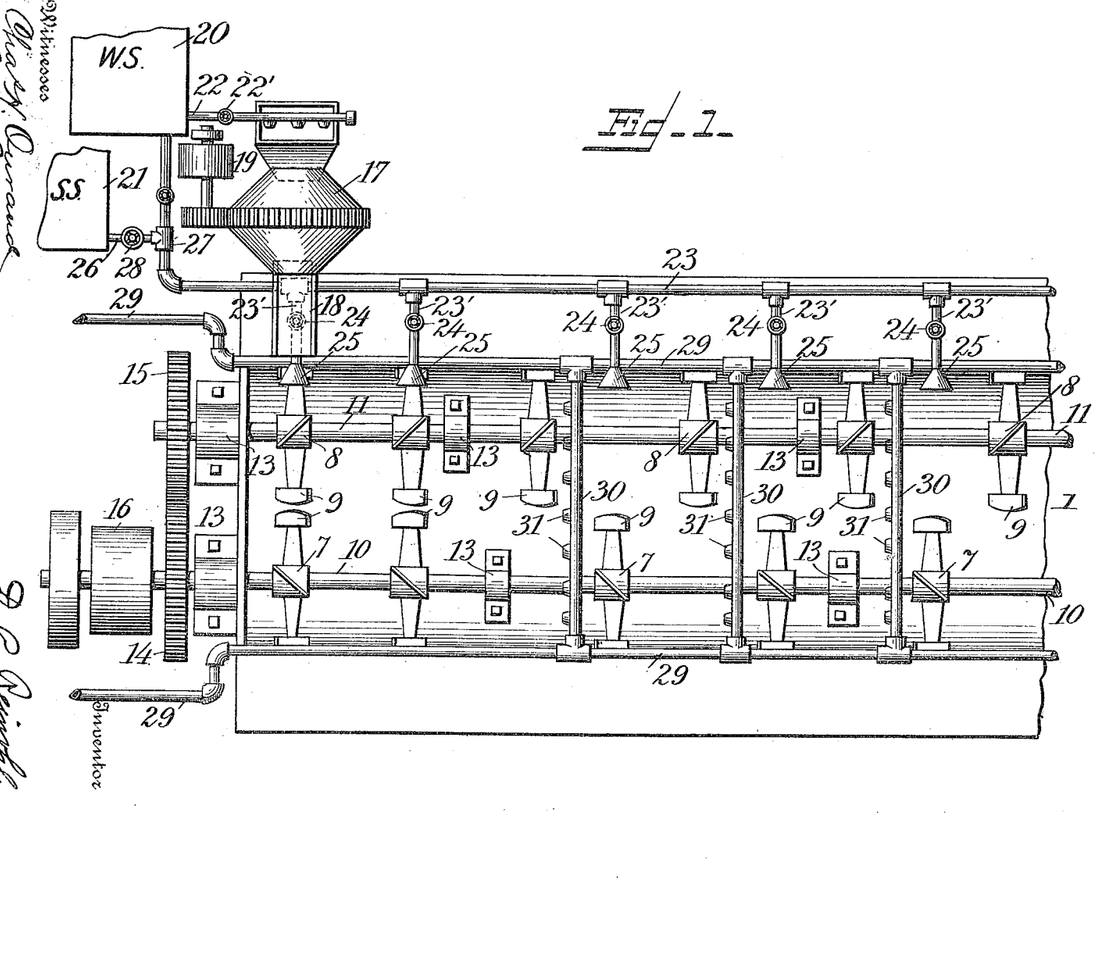
—Figure 1 represents a top plan view of apparatus for treating ores.
Figure 2:
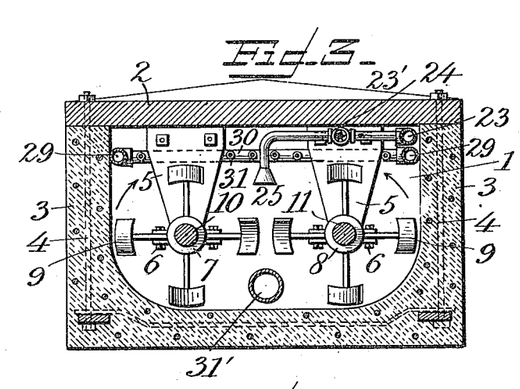
Fig. 2 is a vertical transverse section, on line 2—2 Fig. 1.
Figure 3:
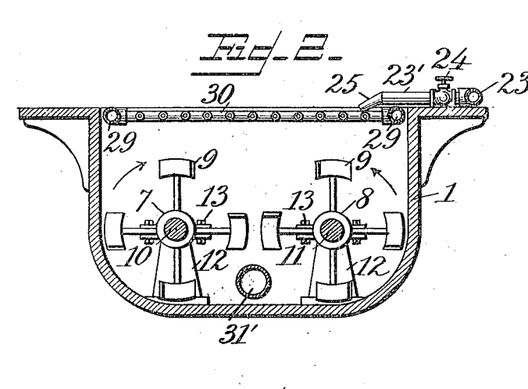
Fig. 3 is a like view of a modified conduit constructed of concrete.

Reference being had to the drawings and the designating characters thereon, the numeral 1 indicates a conduit which may be made of metal as shown in Figs. 1 and 2 of the drawings, or of concrete, as shown in Fig. 3, or it may be made of any other preferred material.

2, in Fig. 3 indicates yokes, of which any required number may be employed, and which yokes cross the conduit transversely, and are secured to the sides, 3, 3 by bolts 4, which are embedded in the sides of the conduit. The yokes are each provided with brackets or hangers 5, having shaft bearings 6, on the ends thereof as shown in Fig. 3.

7 and 8 indicate agitators and conveyers with spirally arranged vanes or blades 9, for the purpose of agitating, aerating, oxygenating and propelling the ore and the solution of pulp while in transit in the conduit and exposed to the atmosphere. The shafts 10 and 11, of the agitators may be supported in the bearings 6 on the brackets of the yokes 2. The length and depth of the blades 9, and the space between the agitators may be varied as necessity requires, and the blades may be adjustably attached to the arms of the agitators.

In the metal conduit shown in Figs. 1 and 2, the shafts 10 and 11, may be supported on pedestals 12, secured to the bottom of the conduit and provided with bearings 13, instead of being supported by the yokes 2, their hangers and bearings, which latter construction is especially adapted for concrete construction of conduits. The shafts are connected by gear wheels 14 and 15, to revolve in unison in opposite directions, preferably toward each other, as indicated by arrows on Figs. 2 and 3, and are driven by an electrical motor 16, or by any other source of power, as may be found most advantageous or desirable.

The conduit 1 is inclined from the receiving to the discharge end thereof to cause the semi-liquid ore or pulp, to flow down its incline by gravity, assisted by the propulsive force of the spirally arranged blades 9 of the agitators 7, 8.

17 indicates one form of an ore and solution mixer, whose discharge spout 18, may be provided with a gate or other valve, not shown, for controlling the discharge of the ore into the conduit 1 in suitable quantity to be further saturated by a solvent, such as cyanid of sodium, cyanid of potassium or other alkaline solvent having affinity for the values contained in the ore. The mixer 17 may be of any preferred form of construction, such as are used for mixing concrete or the like, from which wet ore or pulp is supplied by gravity, and may be operated by a motor 19, or in any other preferred manner.

The ore is reduced by well known means for the purpose to from one hundred and fifty to two hundred mesh, so that every particle of the ore and the values are intimately commingled with the solution and the values almost instantly dissolved.

20 indicates a tank for containing a solution, such as an alkaline solution or cyanid of sodium of about one tenth of one per cent. in strength. 21 is a like tank for a stronger solution of the same chemical, about one per cent. in strength, and the former tank is provided with a pipe 22, which extends to the mixer for supplying solution to the ore.

23 is a pipe connected with the tank 20 and extends practically to the discharge end of the conduit, and said pipe is provided with laterally extending branches 23' directed toward the transverse center of the conduit; the pipe 23 and each branch 23' is provided with a stop cock 24, and on the end of each branch, a fan shaped, or other spray nozzle 25 may be attached to diffuse the solution in the pulp in its plastic condition in the conduit.

The receptacle 21 is provided with a discharge pipe 26 which is connected to the pipe 23 at 27, and is provided with a stop cock 28 for controlling the supply of the strong solution.

The first nozzle in the series, is preferably arranged opposite the ore discharge spout 18, to thoroughly saturate the ore coming from the mixer with a weak solvent, and as the ore is thoroughly agitated, aerated and commingled by the blades of the agitators, 7, 8, contact between the solution and the values is set up. To hasten the consummation and perfection of contact, the solution may be augmented by introducing additional streams of solvent progressively as the union between the solvent and the values is being formed, and at the same time increase the plasticity and fluidity of the pulp; which condition facilitates the contact between the solvent and the values, and the separation between the solids and the liquids in the combined settling tank and filter, the precipitating or zinc box or boxes and the sump tank.

While the ore is being treated in the conduit, the agitators are revolved continuously, carrying air into the pulp, thus affording the maximum agitation, aeration and oxygenation of the pulp in transit, and reducing the time for forming contact or recovering the values to the minimum, about fifteen minutes. In the revolution of the agitators, the spirally arranged blades 9, raise and propel the pulp from side to side of the conduit alternately and also assist in moving the pulp down the conduit toward its discharge end. The speed of travel of the pulp being controlled by the speed of the agitators in their revolution and the angle of incline of the conduit.

The cyanid solution recovered from the sump tanks is returned to the weak solution tank 20, by a suitable pump 54, to be used again, the loss in the strength of the cyanid solution being about three per cent.

The shafts 10 and 11, in practice, are provided with suitable bearings at their upper or lower ends, not shown, to sustain the end thrust of the shafts.

The dimensions and proportions of the parts, the adaptation of mechanical elements for the transmission of power from the motor for propelling the agitators, thrust and ball bearings for the shafts, and general details of construction are obviously within the province of the mechanical engineer, and may be varied to suit the capacity of the plant required and the topographical conditions of environment.

When practicable the conduit, made of cement, properly reinforced, may be placed on the ground on the side of a natural elevation, and all the operating machinery supported on suitable foundations, or said parts may be supported upon trestle work of wood or metal.

The finely comminuted ore or pulp is preferably supplied to the conduit so that it will be delivered at the upper end of the agitators, to be distributed and agitated thereby as additional solvent is supplied thereto from the first nozzle in the series, after which constant, uninterrupted agitation of the pulp is maintained while the pulp is in transit exposed to the atmosphere.

In the treatment of some ores it may be advantageous to supply air to the pulp in excess of that which is supplied directly by the surrounding atmosphere, to increase the oxygen and hasten or expedite the union or contact between the solvent and the values; and to further accelerate this union, hot air may be supplied. This may be effected by means of pipes 29, 29, extending along the conduit above the pulp being treated and connected to a suitable source of supply, such as a compressed air reservoir, not shown. The pipes 29, 29, are connected by a plurality of transverse pipes 30 preferably provided with nipples 31, on one side of the pipes and set at an angle to project streams of air into the pulp as it flows down the conduit, to thoroughly commingle therewith and retard the flow; to afford additional time for the perfection of the union or contact between the solvent and the values, or the pulp may be heated by steam conveyed through a pipe 31', as shown in Figs. 2 and 3.

Figure 4:
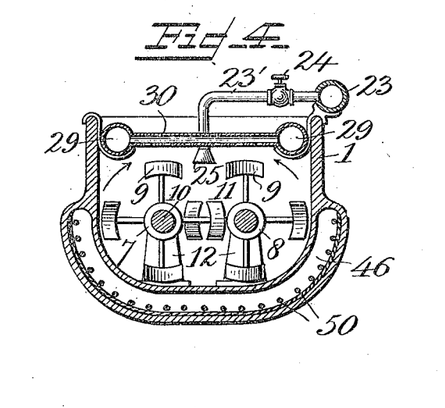
Fig. 4 is a like view on line 4—4 Fig. 8 on an enlarged scale.
Figure 5:
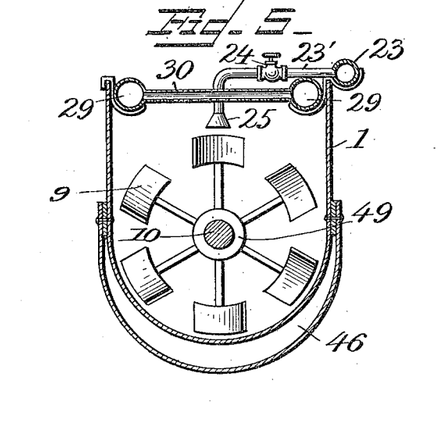
Fig. 5 is a like view of a conduit provided with one agitator and conveyer.
Figure 6:
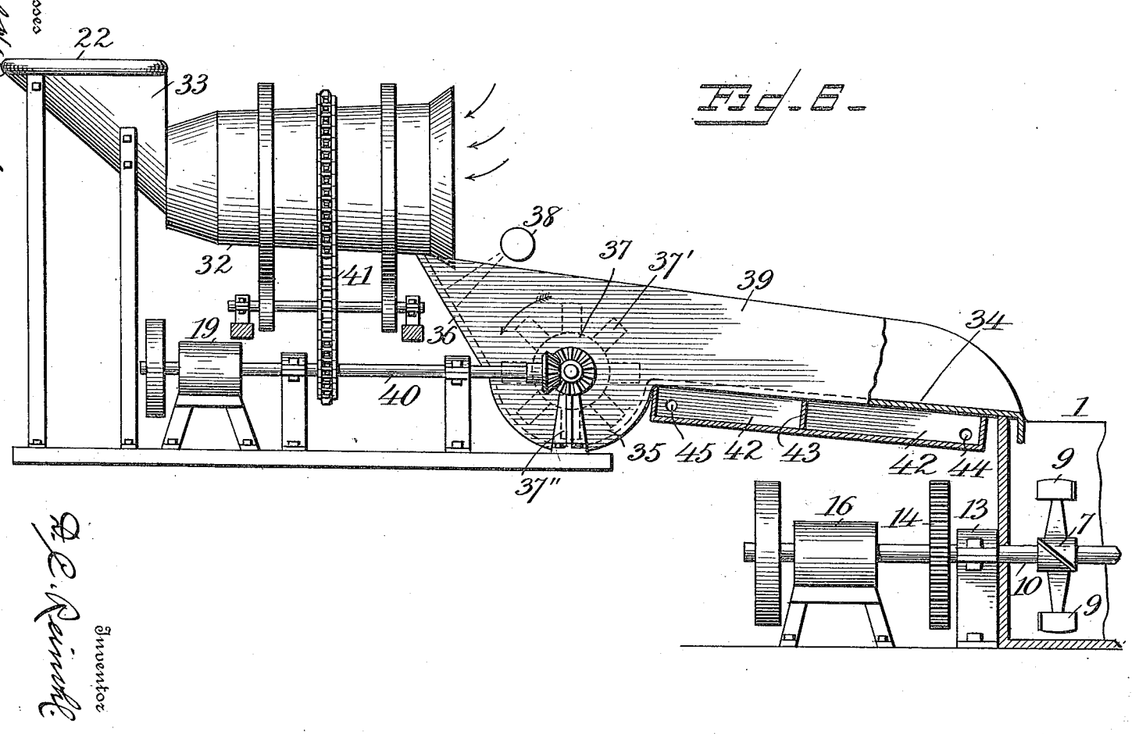
Fig. 6 is a side elevation, partly in section on an enlarged scale, of an ore mixer and distributer.
Figure 7:
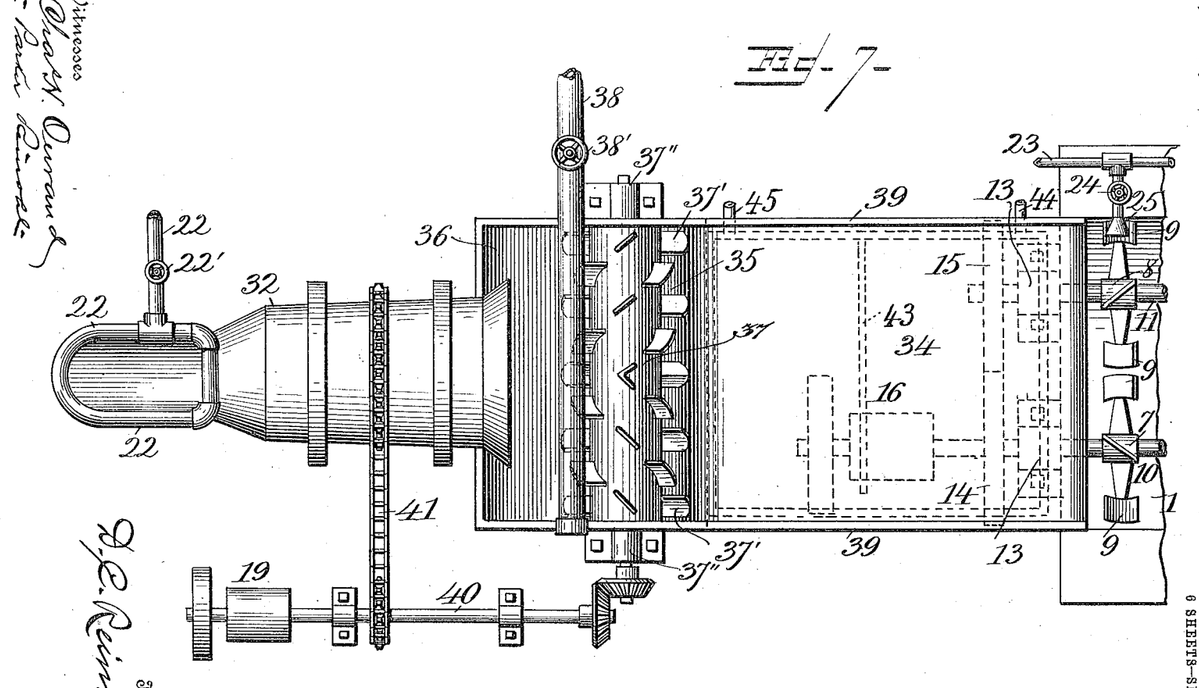
Fig. 7 is a plan view of the same.
Figure 8:
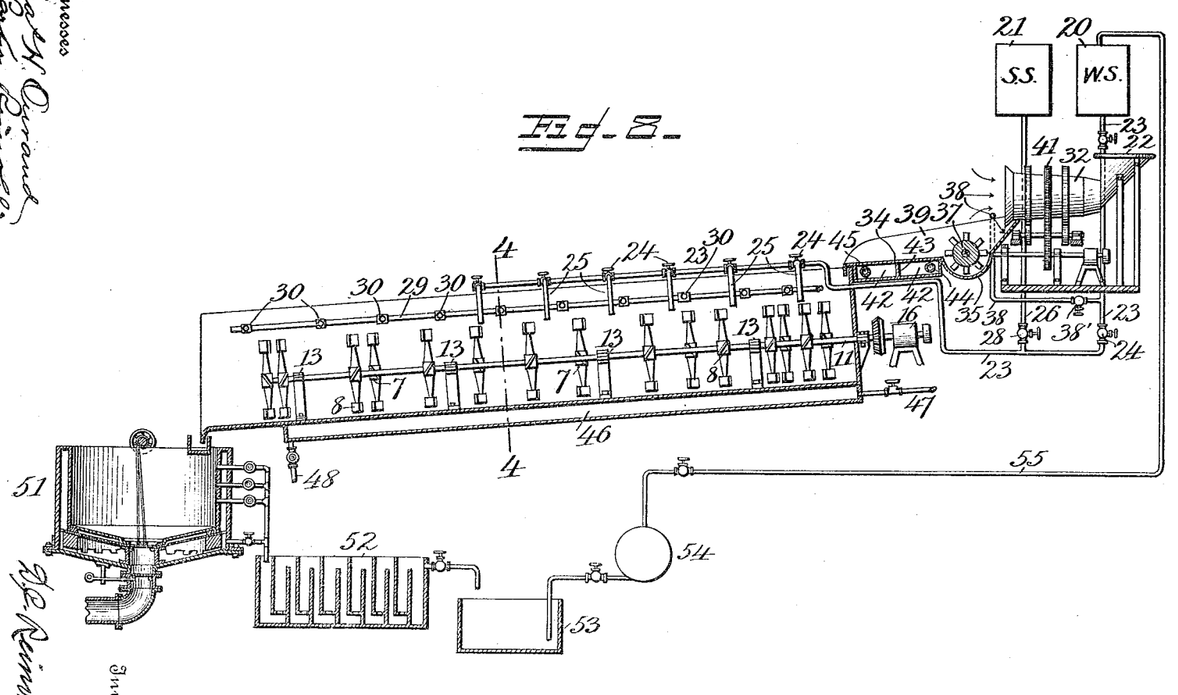
Fig. 8 is a side elevation partly in section on a reduced scale, showing all the parts assembled
Figure 9:
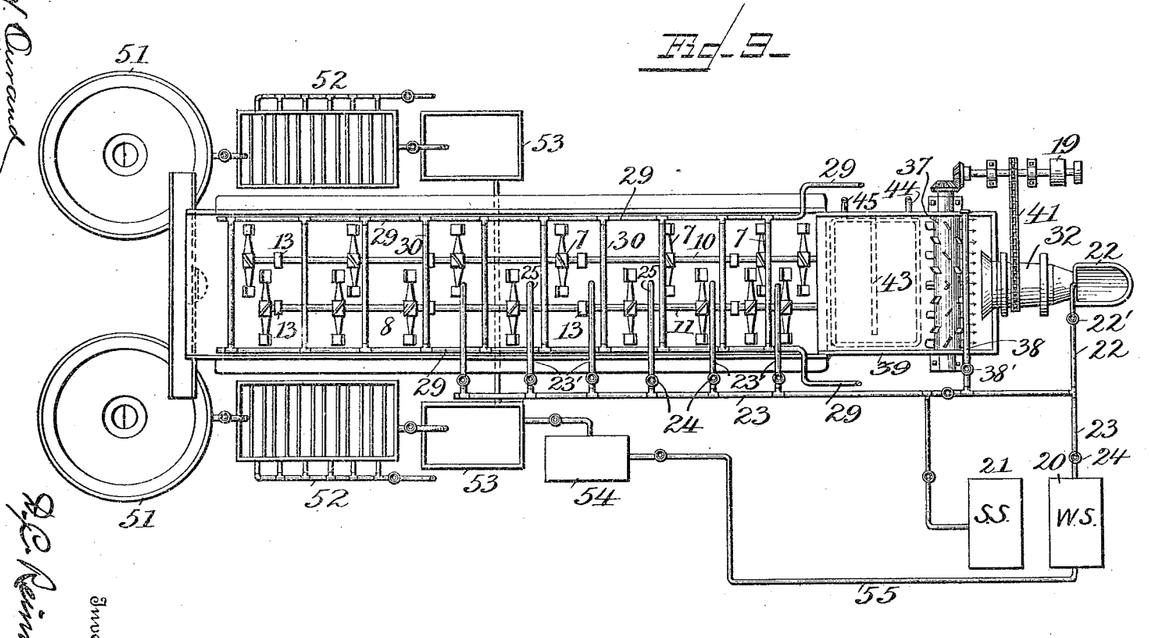
Fig. 9 is a top plan view of the same.

In Figs. 4 and 5, I have shown a modified construction of a mixer for the ore and the solvent and a distributer upon which they are discharged from the mixer, and in which 32 indicates a continuous-feed mixer revolubly mounted, and preferably operated by a motor, such as 19, shown in Fig. 1. The solvent supply pipe 22 extends around the upper end of the hopper 33, is perforated or slotted to maintain the supply of solvent to effect proper admixture with the ore while being agitated and fed down the inclined wall of the hopper, the solvent being controlled by a suitable valve. In the revolution of the mixer, the ore and the solvent are liberally supplied with oxygen contained in the air passing through the mixer from the supply to the discharge end thereof and the ore receives its initial or primary treatment. 34 indicates a launder or plate having a transverse depression 35 at its upper end, and an upwardly extended inclined transverse wall 36 adjacent thereto, and in the depression is a revoluble spreader, propeller and agitator 37, upon which the output of the mixer falls and is diffused, or separated and spread out evenly upon the launder 34 by the spuds 37', set staggering in the periphery of the drum or body of the agitator as it revolves in the depression. In its revolution the agitator throws part of the pulp up on the wall 36, from which it gravitates into the depression 35, and is assisted in its flow, and the supply of solvent augmented by means of a pipe 38, controlled by a valve 38'. which pipe is the equivalent of pipe 23 in the former construction, and is arranged to direct the solvent in a sheet or in numerous streams into the pulp in transit from the mixer to the launder. The agitator or drum 37 is supported in journal bearings 37" formed on the sides or end walls of the depression 35, as shown in Fig. 5. The launder is provided with sides 39, which extend sufficiently high above the agitator to prevent the material splashing out and being wasted while undergoing secondary agitation and aeration. The agitator is driven by an extension of the shaft 40, supporting the sprocket wheel 41 for rotating the mixer 32, or in any preferred manner. From the launder 34, the pulp is discharged into the conduit 1 where it is subjected to further and continuous agitation, aeration and oxygenation; and in consequence of the thorough commingling and admixture of the ore and the solvent previous to their admission to the conduit 1, a very large percentage of the contact between the solvent and the values has already been made by the minimum expenditure of the solvent, and contact proportionately accelerated.

By the thorough commingling of the particles of ore and the solvent, by their constant agitation, aeration and oxygenation while in transit and exposed to the atmosphere, union or contact between the solvent and the values is formed in the conduit in from fifteen to twenty minutes, according to the quality of the ore, the length of the conduit, and the speed at which the pulp travels, thus effecting a saving of nearly one hundred and twenty hours in time, as compared with the use of leaching tanks; a great reduction in the quantity of solvent required, an increase in the percentage of values recovered from the ores and the saving in labor required to remove the sand from the leaching tanks after treatment of the ore therein.

In completing contact between the solution and the values, the ore and the solution or pulp travel slowly along the conduit by gravity assisted by the propulsive force of the spirally arranged blades of the agitators. The strength of the solution and the speed of the agitators must be varied to suit different qualities of ore, in some of which there is a greater affinity of the values for the solution than in others.

It is obvious that changes may be made in details of construction without departing from the spirit of my invention.

Examples of modifications are shown in Figs. 4, 5, 8 and 9, in which a chamber 42 is formed on the under side of the plate 34 provided with a transverse baffle-plate 43, and is supplied with steam through pipe 44, which is discharged through pipe 45, for heating the pulp passing over the plate. The conduit 1 is provided with a chamber 46 having a steam supply pipe 47, and a discharge pipe 48.

The type of conduit 1 shown in Fig. 5, having one agitator and conveyer 49, is preferably made of rolled plate steel and is also provided with a chamber 46 having suitable supply and discharge pipes for steam, not shown.

In some localities, where fuel is scarce and the cost almost prohibitive, the plate 34, and the conduit 1 may be heated by electricity, by conducting wires 50, as shown in Fig. 4 through the chambers, when properly insulated.

It is obvious that the conduit 1 may be made of cast or plate iron in suitable lengths adapted for transportation by rail or on the backs of animals.

51 indicates combined settling tanks and filters, of which there may be any number required to separate the solution from the sands, 52 indicates zinc boxes of conventional form, 53 is the sump in which the solution from the zinc boxes is collected, and 54 is a pump for returning the solution through pipe 55 to the weak solution tank 20 to be used again.

Practical demonstration of the invention has shown that the strength of the cyanid solution is reduced about three per cent., for the reason, that the ore is crushed to not less than one hundred mesh, and preferably to from one hundred and fifty to two hundred mesh, thus exposing the gold and silver in small atoms and as the cyanid treatment consumes only about fifteen minutes, the baser metals have no time to act on the cyanid solution while the cyanid is being brought into contact with the atoms of gold and silver, and the dissolving of the latter takes place almost instantaneously and the solid is changed into a liquid.

The process involved in the invention forms subject matter of a separate application for a patent, filed March 7th, 1911, and numbered 612,952.

Having thus fully described my invention, what I claim is:—

1. Means for treating ore for the recovery of values, comprising a continuous open conveyer or conduit, means for supplying ore to the conveyer, means for supplying a solvent to the ore, means for agitating and aerating the pulp while in transit and exposed to the atmosphere, and means for maintaining the strength of the solvent and increasing the fluidity of the pulp being treated.

2. Means for treating ore for the recovery of values, comprising a continuous open conveyer or conduit, means for supplying ore to the conveyer, means for supplying a solvent to the ore, means for heating the pulp, means for agitating and aerating the pulp while in transit and exposed to the atmosphere, and means for maintaining the strength of the solvent and increasing the fluidity of the pulp being treated.

3. Means for treating ore for the recovery of values, comprising a continuous open conveyer or conduit, means for supplying ore to the conveyer, means for supplying a solvent to the ore, a revoluble agitator and aerator in and approximately the length of said conveyer, and means for maintaining the strength of the solvent and increasing the fluidity of the pulp being treated while in transit and exposed to the atmosphere.

4. Means for treating ore for the recovery of values, comprising a continuous open conveyer or conduit, means for supplying ore to the conveyer, means for supplying a solvent to the ore, means for heating the pulp, a revoluble agitator and aerator in and approximately the length of said conveyer, and means for maintaining the strength of the solvent and increasing the fluidity of the pulp being treated while in transit and exposed to the atmosphere.

5. Means for treating ore for the recovery of values, comprising a continuous open conveyer or conduit, means for supplying ore to the conveyer, means for supplying a solvent to the ore, means for uninterruptedly agitating and aerating the pulp while in transit and exposed to the atmosphere, and means for supplying additional solvent to the pulp progressively as it travels along the conveyer.

6. Means for treating ore for the recovery of values, comprising a continuous open conveyer or conduit, means for supplying ore to the conveyer, means for supplying a solvent to the ore, means for heating the pulp, means for uninterruptedly agitating and aerating the pulp while in transit and exposed to the atmosphere, and means for supplying additional solvent to the pulp progressively as it travels along the conveyer.

7. Means for treating ore for the recovery of values, comprising a continuous open conveyer or conduit, means for supplying ore to the conveyer, means for supplying a solvent to the ore, a continuous revoluble agitator and aerator in the conveyer, means for operating said agitator, and means for progressively maintaining the strength of the solvent supplied to the pulp while in transit and exposed to the atmosphere.

8. Means for treating ore for the recovery of values, comprising a continuous open conveyer or conduit, means for supplying ore to the conveyer, means for supplying a solvent to the ore, means for heating the pulp, a continuous revoluble agitator and aerator in the conveyer, means for operating said agitator, and means for progressively maintaining the strength of the solvent supplied to the pulp while in transit and exposed to the atmosphere.

9. Means for treating ore for the recovery of values, comprising a continuous open conveyer or conduit in which the pulp is exposed to the atmosphere, means for supplying ore to the conveyer, means for supplying a primary charge of solvent to the ore, a continuous revoluble agitator and aerator in said conveyer, means for operating the agitator, and means for supplying a supplemental charge of solvent to the pulp while in transit and in a state of agitation and aeration.

10. Means for treating ore for the recovery of values, comprising a continuous open conveyer or conduit in which the pulp is exposed to the atmosphere, means for supplying ore to the conveyer, means for supplying a solvent to the pulp in transit, a continuous longitudinally extending and revoluble agitator in said conveyer, and means for operating the agitator.

11. Means for treating ore for the recovery of values, comprising a continuous open conveyer or conduit in which the pulp is exposed to the atmosphere, means for supplying ore to the conveyer, means for supplying a primary charge of solvent to the ore, means for heating the pulp, a continuous revoluble agitator and aerator in said conveyer, means for operating the agitator, and means for supplying a supplemental charge of solvent to the pulp while in transit and in a state of agitation and aeration.

12. Means for treating ore for the recovery of values, comprising a continuous open conveyer or conduit in which the pulp is exposed to the atmosphere, means for supplying ore to the conveyer, means for supplying a solvent progressively to the pulp in transit, means for heating the pulp, a continuous longitudinally extending and revoluble agitator in said conveyer, and means for operating the agitator.

13. Means for treating ore for the recovery of values, comprising a continuous open conveyer or conduit in which the pulp is exposed to the atmosphere, means for supplying ore to the conveyer, means for supplying a solvent to the ore, a continuous revoluble agitator and aerator in said conveyer, yokes resting on the conveyer and supporting said agitator and means for operating the agitator.

14. Means for treating ore for the recovery of values, comprising a continuous open conveyer or conduit in which the pulp is exposed to the atmosphere, means for supplying ore to the conveyer, means for supplying a solvent to the ore, a continuous revoluble agitator in said conveyer, and yokes crossing the conveyer and provided with shaft hangers for supporting the agitator.

15. Means for treating ore for the recovery of values, comprising a continuous open conveyer or conduit in which the pulp is exposed to the atmosphere, means for supplying ore to the conveyer, a continuous longitudinally arranged and revoluble agitator in the conveyer, means for operating the agitator, and a pipe extending along the conveyer for supplying a solvent progressively to the pulp in transit.

16. Means for treating ore for the recovery of values, comprising a continuous open conveyer or conduit in which the pulp is exposed to the atmosphere, means for supplying ore to the conveyer, means for heating the pulp, a continuous longitudinally arranged and revoluble agitator in the conveyer, means for operating the agitator, and a pipe extending along the conveyer for supplying a solvent progressively to the pulp in transit.

17. Means for treating ore for the recovery of values, comprising a conveyer, means for supplying ore to the conveyer, means for supplying a solvent to the ore, means for agitating and aerating the pulp while in transit and exposed to the atmosphere, means for supplying additional solvent progressively, and means for supplying air under pressure thereto while in transit.

18. Means for treating ore for the recovery of values, comprising a conveyer, means for supplying ore to the conveyer, means for supplying a solvent to the ore, means for agitating and aerating the pulp while in transit and exposed to the atmosphere, means for supplying additional solvent progressively, means for heating the pulp, and means for supplying air under pressure thereto while in transit.

19. Means for treating ore for the recovery of values, comprising a conveyer, means for supplying ore to the conveyer, means for supplying a solvent to the ore, means for agitating and aerating the pulp while in transit and exposed to the atmosphere, means for supplying additional solvent progressively, and means for projecting streams of air into the pulp while in transit.

20. Means for treating ore for the recovery of values, comprising a conveyer, means for supplying ore to the conveyer, means for supplying a solvent to the ore, means for agitating and aerating the pulp while in transit and exposed to the atmosphere, means for supplying additional solvent progressively, means for heating the pulp, and means for projecting streams of air into the pulp while in transit.

21. Means for treating ore, comprising a continuous and uninterrupted conduit, a longitudinally extending agitator revolubly supported in said conduit, and means for supplying a solvent progressively to pulp in transit and exposed to the atmosphere.

22. Means for treating ore for the recovery of values, comprising a conduit, a plurality of agitators and conveyers arranged parallel to each other and extending longitudinally in said conduit, means for supplying a solvent progressively, and means for operating the agitators.

23. Apparatus for treating ore, comprising means for primarily mixing the ore and the solvent, a continuous open conveyer into which the pulp is discharged and exposed to the atmosphere, and means for continuously agitating, aerating, oxygenating and propelling the pulp while in transit and exposed to the atmosphere.

24. Apparatus for treating ore, comprising means for primarily mixing the ore and the solvent, a continuous conveyer into which the pulp is discharged and exposed to the atmosphere, and means for continuously agitating, aerating, oxygenating and propelling the pulp laterally and longitudinally while in transit and exposed to the atmosphere.

25. Apparatus of the class described, comprising a launder having a transverse depression at one end, a revoluble agitator spreader and propeller in said depression, a wall adjacent to and extending above the depression, and means for projecting a stream of solvent into the pulp while passing over said wall, and means for continuing the treatment of the pulp.

26. Apparatus of the class described, comprising means for primarily mixing ore and a solvent, a launder having a transverse depression at one end, a revoluble agitator in said depression, a transverse inclined wall adjacent to one side, and walls at both ends of said depression extending above said agitator, means for supplying a solvent to the pulp between the mixer and the agitator, and means for continuing the treatment of the pulp.

27. Apparatus of the class described, comprising means for primarily mixing ore and a solvent, a launder having a transverse depression at its upper end, a wall adjacent to and above said depression adapted to receive pulp from the mixer, and a horizontal agitator and spreader revolubly supported in the depression and upon which the pulp is discharged, means for supplying a solvent to the pulp, and means for continuing the treatment of the pulp.

28. Apparatus of the class described, comprising a primary ore and solvent mixer open to the atmosphere at its receiving end and its discharge end and constructed to deliver a continuous supply, a launder having an upwardly extending end and adjacent to said mixer, means for supplying solvent to the pulp in transit, a revoluble agitator and spreader for distributing the pulp on the launder, and means for continuing the treatment of the pulp.

29. Means for treating ore for the recovery of values, comprising a launder having a transverse depression at one end, a revoluble agitator, spreader and propeller in said depression, means for supplying solvent to the pulp, means for heating the pulp while passing over the launder, a conduit beyond the launder, means for heating the bottom of the conduit and means for agitating and aerating the pulp while in transit and exposed to the atmosphere.

30. Apparatus of the class described, comprising a launder having a transverse depression at one end, a revoluble agitator, spreader and propeller in said depression, means for supplying a solvent to the pulp while being treated, means for heating the pulp passing over the launder, and means for continuing the treatment of the pulp.

31. Means for treating ore for the recovery of values, comprising a continuous open conveyer or conduit, means for supplying ore to the conveyer, means for supplying a solvent to the ore, means for agitating and aerating the pulp while in transit and exposed to the atmosphere, means for maintaining the strength of the solvent and increasing the fluidity of the pulp being treated, means for separating the values from the pulp, and means for returning the solvent to the stock tank.

32. Apparatus for treating ore, comprising means for primarily mixing the ore and the solvent, an open conveyer into which the pulp is discharged and exposed to the atmosphere, and means for continuously agitating, aerating, oxygenating and propelling the pulp while in transit and exposed to the atmosphere, means for separating the values from the pulp, and means for returning the solvent to the stock tank.

In testimony whereof I affix my signature, in presence of two witnesses.

DAVID C. REINOHL.

Witnesses:
WM. PARKER REINOHL,
FRANCIS A. REINOHL.

---

Copies of this patent may be obtained for five cents each, by addressing the "Commissioner of Patents, Washington, D. C."